Oct. 3, 1961     E. FRIEDERICH     3,002,229
METHODS FOR OPERATING WORM-TYPE DIE-CASTING MACHINES
Filed April 27, 1959     3 Sheets-Sheet 3

Inventor
Ernst Friederich
By Ralph B. Stewart
Attorney

United States Patent Office 3,002,229
Patented Oct. 3, 1961

3,002,229
METHODS FOR OPERATING WORM-TYPE
DIE-CASTING MACHINES
Ernst Friederich, Darmstadt, Hesse, Germany, assignor to
Ankerwerk Gebr. Goller, Nurnberg, Bavaria, Germany,
a firm
Filed Apr. 27, 1959, Ser. No. 809,157
Claims priority, application Germany May 6, 1958
3 Claims. (Cl. 18—55)

With a view to improving the in some respects shortcomings of the piston-type die-casting machine for plastic masses, the worm, known from the extruder, is recommended as plasticizing element. The rotation of the worm effects the plasticizing by the shearing forces produced in the mass. The injection of the plasticized mass into the mold is performed in some arrangements by a piston and in other arrangements by the axial displacement of the worm which, in this case, acts like a piston.

In trying out the latter arrangement it was discovered that the transporting force of the worm can attain considerably higher values than was hitherto imagined. Thus, a worm can feed against a pressure of 1200 kgs. per square centimeter.

The known worm-type die-casting machines require a relatively great mechanical expenditure of energy as the bearings for the worm must take up the rotation as well as the axial displacement. Furthermore it is necessary to provide driving mechanisms for the rotation and for the axial displacement.

The object of the invention is to improve the operation of the known constructions so that the axial displacement of the worm is avoided.

According to the invention only a rotary drive is provided for the worm, which, however, effects the rotation of the worm at at least two different speeds. Thus an arrangement is produced in which the worm plasticizes the mass at a low speed of rotation in an order such as is known from the extruder and, after a considerable increase in the number of revolutions, injects the mass into the mold by the strong feed caused by the increase in speed. For example the number of revolutions at the slow speed is in the region up to about 120 revolutions per minute, whereas the number of revolutions for the injection is in the order of, for example, up to 1500 revolutions per minute.

The preferred form of construction of the invention has an open discharge nozzle, but the provision of a device for closing the aperture at the front end of the cylinder comes within the scope of the invention.

Other advantages and features of the present invention will become apparent from the following description of the preferred form of construction which is illustrated by way of example in the accompanying drawings, in which FIG. 1 shows a worm-type die-casting machine in side elevation, partly in section;

Figure 1:
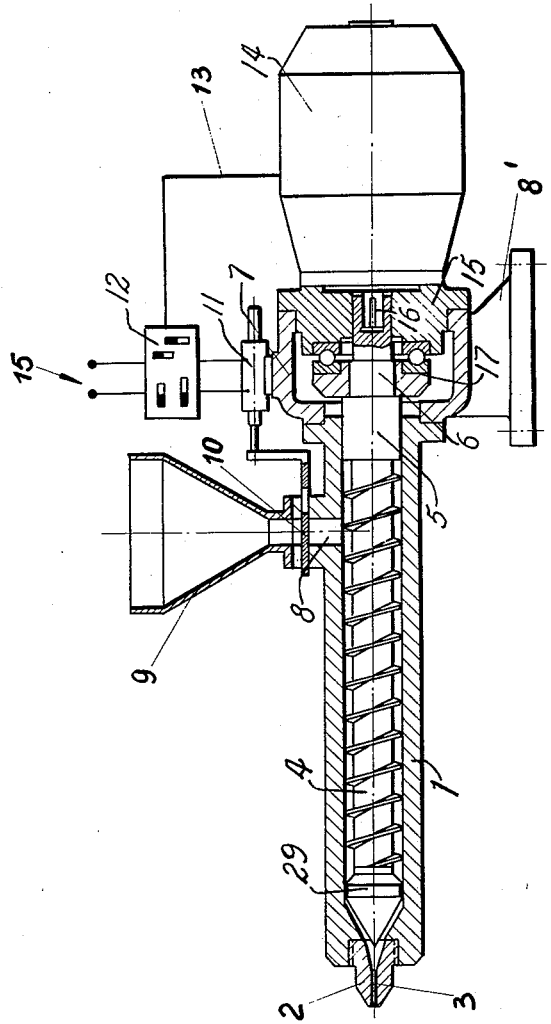
Figure 2:
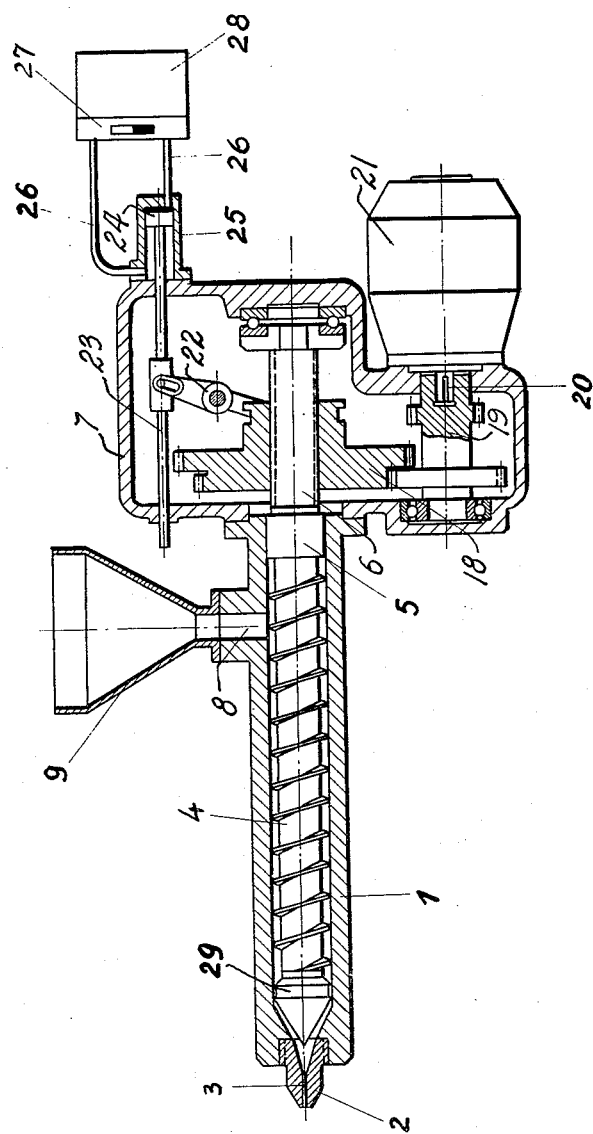
FIG. 2 is a modified form of construction of a worm-type die-casting machine, also in side elevation and partly in section.

In FIGS. 1 and 2 similar parts of the machine are designated by the same references.

The machine according to FIG. 1 comprises a cylinder 1, the front end of which is closed by a nozzle 2. This nozzle has an aperture 3 widening conically towards the interior of the cylinder 1. A worm 4 is mounted in the cylinder 1. This worm has on its front end directed towards the nozzle 2 a head 29 which is of larger cross-section than the shank of the worm 4 and tapers conically towards the nozzle. It is pointed out that the external diameter of this head 29 is smaller than the internal diameter of the bore of the cylinder 1.

The worm 4 has at the rear end of the cylinder, a collar 5 which closes the rear end of the bore of the cylinder 1, with the aid of packing means if such are required. An extension 6 of the worm projects behind the collar 5 into the housing 7 of the machine accommodating the driving means.

The cylinder 1 is provided with a feed aperture 8 near its rear end which is closed by the collar 5. A funnel-shaped storage receptacle 9 for the plastic mass is mounted on this feed aperture. A shutoff device 10 is arranged on the support in which the feed aperture 8 is located so that this aperture can be selectively closed or opened.

In the form of construction illustrated in FIG. 1, the shutoff device 10 constructed as a slide valve, is actuated by a magnet 11, the energizing circuit for which is connected up with a control unit 12. This control unit is also connected up with a driving motor 14 by means of a circuit only one pole wire 13 of which is indicated, and has a mains connection 15. Switches are provided on the control unit for controlling the operating magnet 11 either by hand or depending upon a switching in or over of the electric motor 14.

The electric motor 14 is flanged on the housing 7 which is mounted on a bed by means of a bracket 8. The part forming the end wall 15 of the housing serves at the same time as bearing for the worm extension 6. Within this part the shaft end 16 of the electric motor is connected with the extension 6. An axial pressure bearing 17 is also arranged between the housing part 15 and the collar 5.

The motor 14 is equipped for different speeds of rotation. It is preferably a motor with switching connections for changing the number of poles. In the control unit 12 connections are provided so that the shutoff device 10 is in open position when the motor 14 is running at low speed and is brought into closed position when the motor is switched on to higher speed.

It is pointed out that there are two retarding arrangements, for example two retarding relays in the control unit 12, which relays are connected up in series either with the operating magnet 12 so that this only responds after the motor 14 has been switched over to higher speed, or with the magnetic contactor of the motor 14 so that this is only switched over to high speed after the shutoff device has already been closed.

The parts of the construction shown in FIG. 2 correspond substantially to those shown in FIG. 1.

According to FIG. 2 only another device is provided for producing the two different speeds of rotation of the worm. A change-over gear 18 is located in the housing 7, the shiftable part of this gear being arranged, for example on the splined extension 6 of the worm 4. This part can be brought selectively into engagement with the group of wheels arranged on a shaft 19 for producing different ratios of transmission. The shaft 19 is coupled with the shaft end of an electric motor 21 flanged on the housing 7.

The change lever 22 of the gear 18 is actuated by a rod system 23. This rod system carries on a projecting end a piston 24 which is slidable in a cylinder 25. The two ends of the cylinder are connected by conduits 26 with a switching contrivance 27 for the operating medium. This switching contrivance 27 communicates with a plant 28 for storing or compressing the pressure medium. For example, hydraulic or pneumatic pressure medium may be used.

According to the construction shown in FIG. 2, the electric motor runs only at one speed. By means of a change lever on the switching contrivance 27 the rod system 23 can be actuated to switch the gear 18 on to higher speed, with the result that the worm 4 is driven accordingly for extruding the plastic mass.

It is pointed out that the plant according to FIG. 2 has no slide on the feed aperture 8. Accordingly the possibility exists of constructing the device shown in FIG. 1 without the slide 10 or the device shown in FIG. 2 with a slidable shutoff element. The question as to whether such a slide should be provided depends, for example, upon the actual properties of the plastic mass to be worked.

In the case of the arrangement incorporating the slide 10, it is possible to provide for this to be operated by hand.

Figure 3:
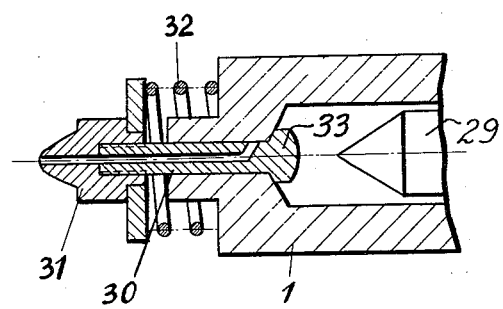
FIG. 3 shows in longitudinal section a slide closure suitable for use on the machines illustrated in FIGS. 1 and 2.
Figure 4:
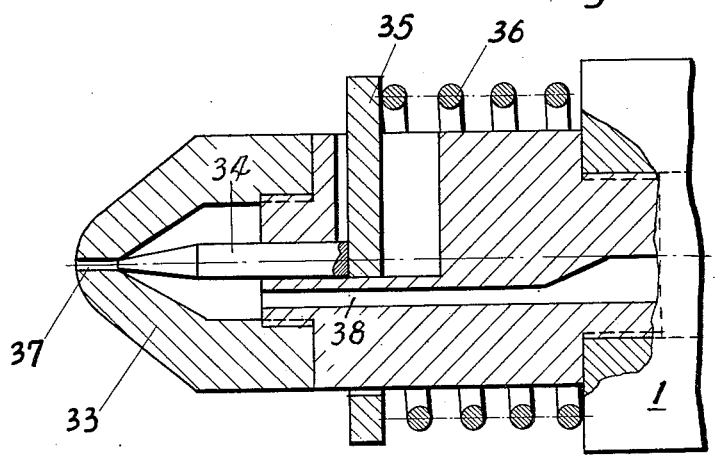
FIG. 4 is a longitudinal section of a needle dam or valve for the nozzle, which can also be employed on the machines illustrated in FIGS. 1 and 2.

According to FIGS. 1 and 2 the nozzles 2 are of open construction. Both plants might be equipped with a closing device similar to that illustrated in FIGS. 3 and 4 or with closing devices otherwise conventional in the technique of die-casting. FIGS. 3 and 4 show known forms of construction so that a detailed description thereof is not considered to be necessary. FIG. 3 shows a slide closing device known per se, in which a slide 30 is introduced in the mouth of the cylinder 30 and has a passage leading into the nozzle 31. This slide is pressed into its forward position by means of a spring 32 with the result that the cylinder is closed by the valve body 33 arranged on the slide. By exerting pressure on the nozzle 31, the rear mouth of the passage is brought into communication with the inner space of the cylinder.

The needle dam or valve illustrated in FIG. 4 has a needle 34 guided in the nozzle body 33 and supported by a crosspiece 35 extending to the outside. A spring 36 acts on this crosspiece in the closing direction of the nozzle aperture 37. The pressure medium is conducted out of the cylinder 1 through several passages 38 leading to the interior of the nozzle chamber. The needle is operated by the pressure prevailing in the pressure medium acting on the point of the needle so that the opening is dependent upon the pressure produced.

It is pointed out that individual elements of the different forms of construction illustrated can be combined in various ways. Alternating or direct current motors or other suitable driving means can be provided for the drive. Furthermore, it is also possible, for example, to provide two electric motors one for each speed of rotation.

When the machines illutrated in FIGS. 1 and 2 are operated, the worm is driven, for example, first at 30 revolutions per minute with the result that the plastifying mass collects along the screw threads of the worm 6 because either a closing device arranged on the nozzle is closed or the outlet of the nozzle under the feeding pressure produced by the low speed of rotation is substantially closed by the high resistance due to the small nozzle cross-section. The pressure of the plastic mass collecting in the vicinity of the head 29 therefore increases. On switching over to a higher number of revolutions and if necessary opening the nozzle, the mass is injected quickly into the mold under high feed pressure.

I claim:

1. The method of operating a die-casting machine of the type in which includes a hollow cylinder closed at its front end by a nozzle, a worm rotatably guided in the bore of the cylinder having a packing arrangement at the rear end of the cylinder for closing the cylinder bore, a feeding aperture for the plastic mass in the wall of the cylinder near the rear end closed by the packing arrangement, and with driving means for the worm, which method comprises the steps of first driving the worm at a low speed to placticize the molding material into a plastic mass behind the nozzle, and then driving the worm at a higher speed to extrude the plastic mass out of the nozzle.

2. A method according to claim 1, and including the step of maintaining the feed aperture of the cylinder closed while the worm is being driven at higher speed.

3. A method according to claim 1, wherein the worm is driven during the first working phase at a speed up to 120 revolutions per minute and during the second working phase at a considerably higher speed, for example up to about 1500 revolutions per minute.

References Cited in the file of this patent
UNITED STATES PATENTS

| | | |
|---|---|---|
| 2,439,966 | Dinzl | Apr. 20, 1948 |
| 2,448,947 | Arthur et al. | Sept. 7, 1948 |
| 2,668,986 | Miler | Feb. 16, 1954 |